US008478290B2

(12) United States Patent
Yoeli

(10) Patent No.: US 8,478,290 B2
(45) Date of Patent: Jul. 2, 2013

(54) METHOD TO REDUCE DATABASE LOAD IN REAL TIME LOCATION SYSTEMS

(75) Inventor: Baruch Yoeli, Tel-Aviv (IL)

(73) Assignee: Aeroscout, Ltd. (IL)

( * ) Notice: Subject to any disclaimer, the term of this patent is extended or adjusted under 35 U.S.C. 154(b) by 189 days.

(21) Appl. No.: 12/868,466

(22) Filed: Aug. 25, 2010

(65) Prior Publication Data
US 2012/0094683 A1 Apr. 19, 2012

Related U.S. Application Data

(60) Provisional application No. 61/244,217, filed on Sep. 21, 2009.

(51) Int. Cl.
*H04W 4/02* (2009.01)
(52) U.S. Cl.
USPC .................................. 455/456.1; 455/404.2
(58) Field of Classification Search
USPC .......... 455/456.1–456.6, 404.1–404.2, 412.1, 455/414.2, 457, 466; 709/203, 232–235; 340/10.1, 12.51
See application file for complete search history.

(56) References Cited

U.S. PATENT DOCUMENTS

| 6,912,398 | B1 * | 6/2005 | Domnitz ....................... 455/461 |
| 8,073,460 | B1 * | 12/2011 | Scofield et al. ............ 455/456.1 |
| 8,253,539 | B2 * | 8/2012 | Scaramozzino ............. 340/10.2 |
| 2004/0192337 | A1 * | 9/2004 | Hines et al. ................ 455/456.1 |
| 2004/0198325 | A1 * | 10/2004 | Brueckner et al. ......... 455/412.1 |
| 2007/0026871 | A1 * | 2/2007 | Wager ........................ 455/456.1 |
| 2007/0117591 | A1 * | 5/2007 | Ben Rached et al. ...... 455/562.1 |
| 2007/0149214 | A1 * | 6/2007 | Walsh et al. ............... 455/456.1 |
| 2007/0171992 | A1 * | 7/2007 | Shameli et al. .............. 375/257 |
| 2008/0032706 | A1 * | 2/2008 | Sheynblat et al. ......... 455/456.1 |
| 2008/0084310 | A1 * | 4/2008 | Nikitin et al. .............. 340/572.7 |
| 2010/0291894 | A1 * | 11/2010 | Pipes ........................ 455/404.2 |

* cited by examiner

*Primary Examiner* — Kashif Siddiqui
(74) *Attorney, Agent, or Firm* — Finnegan, Henderson, Farabow, Garrett & Dunner, LLP

(57) ABSTRACT

A location system and method operable to locate mobile units has a mobile unit operable to transmit wireless signals. A wireless network is used to receive the wireless signals and to report data used to estimate the location of the mobile unit. A location server is used to process the data reported by the wireless network. The location server generates a plurality of location reports for the mobile unit. A preprocessing component is operable to communicate with the location server. The location reports generated by the location server are transferred to the preprocessing component. A location application is operable to communicate with the preprocessing component, and interfaced to a database operable to store data records related to the mobile unit. The preprocessing component processes the location report and stores the data records only if the data in the data records meets a specified criteria.

29 Claims, 10 Drawing Sheets

METHOD TO REDUCE DATABASE LOAD IN REAL TIME LOCATION SYSTEMS

RELATED APPLICATIONS

This patent application is related to and claims the benefit of U.S. Provisional Application No. 61/244,217, filed Sep. 21, 2009, entitled "METHOD TO REDUCE DATABASE LOAD IN REAL TIME LOCATION SYSTEMS" in the name of the same inventor, and which is incorporated herein by reference in its entirety.

FIELD OF THE INVENTION

The present invention relates to location system, and more specifically, to a system and method for reducing the database load and/or size in a location system.

BACKGROUND OF THE INVENTION

A multitude of wireless communications systems are in common use today. Mobile telephones, pagers and wireless-connected computing devices such as personal digital assistants (PDAs) and laptop computers provide portable communications at virtually any locality. Wireless local area networks (WLANs) and wireless personal area networks (WPANs) according to the Institute of Electrical and Electronic Engineers (IEEE) specifications 802.11 (WLAM) (including 802.11a, 802.11b, 802.11g, 802.11n, etc.), 802.15.1 (WPAN) and 802.15.4 (WPAN-LR) also provide wireless interconnection of computing devices and personal communications devices, as well as other devices such as home automation devices.

Within the above-listed networks and wireless networks in general, in many commercial and industrial applications it is desirable to know the location of mobile wireless devices like RFID tags.

A typical application of such a location system includes storage of real time location information as well as other data that is transmitted by the tag such as temperature, pressure and other telemetry data.

The location server of the location system generates location reports including the estimated position of the tag, the tag identification and optionally any other information reported by the tag itself as telemetry data. Typically the location report also includes the time stamp of the time (date and time) in which the tag reports were received by the location server.

The location information would turn into business related data that has tangible context that the end user of the location application can relate to.

Tangible data context can be a location, map or a zone within the location that has name which the user is familiar with or he can relate to, a business status of an object to which the tag is attached (e.g. infusion pump, bed, car or any other kind of asset), an ID of a person carrying the tag or a category that an asset belongs to.

The total volume of location reports generated by the location server that the application would have to process is derived from a number of parameters, some of which are:
  a. The number of mobile units that the system can receipt. For example those mobile units may be RFID (Radio Frequency Identification) tags or mobile devices such as a PDA.
  b. The mobile unit transmission rate.
  c. The total number of location reports reported by the location system.
  d. The number of location systems that are connected to the location application.

A system which analyses and stores all location reports in a naive way; where each location report containing data is stored and processed, will run, after a very short time, out of resources and the end user may be required to purchase a higher grade of a database server and purge the data more frequently.

The following is a simple RTLS (Real Time Location System) scenario that can illustrate the background for the invention:

A typical location application in a hospital which manages 5,000 assets, each asset has one RFID tag attached to it. The RFID tags transmit at an average blink rate of once every 2 minutes. This report rate relates to active RFID tags, or other active components reporting independently such as a laptop computer with a wireless network card or Passive RFID tags reporting in the in the vicinity of a passive RFID readers or gates.

The following is a calculation of the number of records in the database of the system, using the above scenario:
Number of Assets=5000.
Average blink rate=once every 2 minutes or 30 times per hour.
The number of location reports every hour that will flow into the system is: 30×5,000=150,000 records.
The number of location reports every 24 hours will be 24×150,000=3,600,000 records.
Assuming that the average history required by the application is 60 days, the number of records to be stored in the system will be 216,000,000 records.
Altering one of the parameters in the description of the example above, i.e. number of assets, average report rate or history required will have an impact on the total number of records and the system performance. For instance, adding 3,000 RFID tags or other type of mobile units and assuming all other parameters do not change, would generate 345,600,600 records that have to be stored and analyzed every 60 days.

Thus, a need existed to provide a system and method to overcome the above problem. The current invention is addressed to significantly reduce the load and/or size of a database by reducing the amount of data stored and analyzed by the location system application.

SUMMARY OF THE INVENTION

The above objectives of using a method to reduce the load and database size in a location system are achieved in method and in a system.

The method is embodied in a system that determines which data can be diluted, combined or filtered, as set by a system user or as determined by a self learning system component.

More specifically, this invention applies to real time location systems (RTLS) applications, in which mobile wireless devices are located in a certain area covered by the RTLS system. In one type of RTLS, the mobile units (e.g. RFID tags, cellular phones, or other type of mobile units) broadcast multiple wireless signals which are used to locate the mobile devices, which are located by a location server. Another type of RTLS includes passive devices which are located by responding to passive gates or readers within the passive tag proximity. The gates or readers position is used to estimate the location of the passive devices.

Another type of RTLS which also applies to this invention consists of mobile units which locate themselves (e.g. using an embedded GPS receiver or listening to beacon signals transmitted by the wireless network devices). In some RTLS systems, the location process may be performed with the assistance of a server which provides location-related information to the mobile unit. This location-related information may be related to a differential GPS, Aided-GPS system or to any other type of information which can be used by the mobile unit to calculate its location (e.g. radio maps, position of network devices, etc.).

In some cases, the mobile units collect information from the wireless network and forward this information to a location server, typically using the same wireless communication network. For example, the wireless network devices transmit signals (e.g. beacons) which are received by the mobile unit (e.g. RFID tag, cellular phone, laptop, etc.). The mobile unit measures one or more parameters (e.g. RSSI, TOA, etc.) of the received signals and send this information to a location server which uses the measured parameters to estimate the location of the mobile unit.

Therefore and according to a preferred embodiment, a typical RTLS consists of a wireless network, with at least one wireless mobile device having a unique identifier (ID) used to identify the wireless mobile device, at least one network device also having an identifier, wherein the network device includes at least one signaling component capable of transmitting signals, and at least one receiving component capable of receiving signals and at least one location server connected to that network device.

The mobile wireless device is operative to transmit multiple wireless signals which are received by one or more network devices (the network includes wireless communication network devices intended to allow the location of mobile units in a certain area) in the vicinity (in communication range) of said mobile wireless device.

After said wireless signal is received at said one or more wireless network devices, they transmit to the location server (typically using a wired network like Ethernet or a wireless link) a message, which at least includes the unique identifier of the received mobile wireless device and the identifier of the network device which received the wireless signal.

The message to the location server may also include different types of additional information as Time-of-Arrival (TOA) of the wireless signal at measured by the network device, the received signal strength indicator (RSSI) of the wireless signal as measured by the network device, angle of arrival, telemetry data transmitted by the mobile wireless device and included in the wireless signal, etc. In accordance with one embodiment, the mobile wireless device includes a GPS (Ground Positioning System) receiver and the wireless signal also includes GPS data.

In another embodiment, the wireless network devices transmit signals (e.g. beacons) which are received by the mobile device (e.g. RFID tag, cellular phone, laptop, etc.). The mobile device measures one or more parameters (e.g. RSSI, TOA, etc.) of the received signals and performs a calculation of its position or transfers the measured parameters to a location server to calculate the location of mobile unit. When locating itself, the mobile unit may use one or more methods to calculate its location, including the use of GPS, differential GPS, Aided GPS (A-GPS), fingerprinting methods using radio maps, multilateration based on distance measurement to network devices (e.g. using RSSI, round trip time, etc.), multilateration using TDOA, and other location methods.

The location server may use different methods to locate the mobile wireless device. In some cases, the location server can simply report the location estimated by the mobile device itself (e.g. with GPS) while in other cases it can process this location reported by the mobile device in the location server (e.g. combine it with a location estimated with another method of location) and report a location which is estimated by the location server.

Once the location server calculates the location of the mobile unit or uses the location as calculated by the mobile device itself, it generates a location report which includes the calculated location and the unique identifier of the mobile device. Optionally this report may include other data fields. Following some examples of those fields:

Time of location. This is the time stamp provided by the location server specifying the time the mobile unit was located (the time the tag reports were received at the location server).

Mobile device telemetry data (e.g. battery status, motion status, temperature, pushbutton information, etc.)

Location method (e.g. TDOA, RSSI, distance measurement, GPS, A-GPS, etc.) and quality of location.

In a typical RTLS, the report generated by the location server is sent to a higher level application (location application) which processes the report and provides useful information to the RTLS user.

Many RTLS systems also include additional network devices used to trigger the mobile device in certain conditions and activate in those devices different operations (e.g. transmit signals, program operating parameters, etc.

This patent further refers to a preprocessing component in the system connector (typically it may be an application gateway or a standalone application), which connects between a location server and a location application. It also refers to a preferred logic to accomplish a balance between an optimal resource usage and a minimal impact on the asset location precision that the location application reports to the end user.

Embodiments of this invention may be grouped as following:

Embodiments in which the specified filtering, diluting or combining criteria are based on comparing current location report data with a previous single location report data or multiple location report data.

Distance filter that calculates the distance between the locations of the unit reported in the current report to the location of the unit in a previous report and determines which reports can be diluted or combined based on the actual location distance between the latest report and the previous one or ones.

Time based filter that calculates the time difference between the time stamp in the current location report and the time stamp in the previous one and determines which report can be diluted or combined based on the time interval between reports.

Fixed count based filter that dilutes or combines a location report by a fix ratio between location reports that are diluted and ones that are stored.

Temperature change filter, or other telemetry data reported together with the location report such as humidity, battery level of the tag, pressure, motion indicator, push button indicator etc., which dilutes or combines a location report if the temperature and/or other data reported together with the location and the unit identifier, is out of range or within range of given values.

Embodiments in which the specified filtering, diluting or combining criteria are based on fixed data such a category of an asset or tag, time frame within the day, zone of interest (e.g. a patient room, a warehouse, a specific floor in a building, etc.) or location technology (e.g. TDOA, RSSI, Ultra wideband (UWB), etc.). An asset is any movable object which can be located by attaching to it a tag. In some cases, the tag can be embedded into the asset itself.

Filter, dilute or combine location reports by location report data content criteria which are in or out of the user's predefined range, such as temperature, humidity, and battery level and motion indicator.

Filter, dilute or combine location report of a mobile unit by the unit's location proximity to a specific zone on the map.

Filter, dilute or combine location report of a mobile unit depending if the unit's location is within the limits of an area of interest or out of it. This filter may be applied to more than one zone of interest, wherein the filtering criteria may differ according to the zone of interest in which the unit was located.

Filter, dilute or combine location reports by the report time stamp, for instance a report between 12 am and 6 am may be out of the system user's interest.

Filter, dilute or combine location reports by asset attributes such as category, group or location technology.

Filter, dilute or combine location reports by the mobile unit type.

Embodiments in which the specified filtering, diluting or combining criteria are based on Self-Learning analytical algorithms which allow the system to follow patterns (e.g. movement pattern) created while using the system and refer to them, rather than refer to static data. In this case, the specified criteria used to filter, dilute or combine location reports is automatically and dynamically generated by the system based on self-learning algorithms operable to identify patterns which describe repetitive behavior of a mobile unit. The following are some exemplary embodiments:

Filter or combine location reports on specific assets by typical user interest during specific times, for instance—The system will learn the data on specific assets is queried during the mornings and not over the weekends.

The system will learn a typical trail (movement pattern) of units or category of units and attach a location report to a known and adaptive path.

Optionally and referring to the embodiment above, the system will study and record the typical time frames on which assets and units are static or in movement and will apply different filter rates when a unit is located in a static location or in motion.

The methods mentioned above for embodiments are based on comparing data in the current location report to data in one or more previous location reports and according to specified criteria as described above. This specified criteria maybe predefined by the user or automatically and dynamically set by the system itself.

As can be easily understood, many other examples of filtering, diluting or combining criteria can be specified still within the scope of this invention.

Some of the methods mentioned above are based on comparing data in the current location report to data in one or more previous location reports and according to specified criteria as described above. This specified criteria maybe predefined by the user or automatically and dynamically set by the system itself.

As can be easily understood, many other examples of filtering, diluting or combining criteria can be specified still within the scope of this invention.

Therefore, following are several features achievable using embodiments of the present invention:

Database size will decrease and as a result its performance, with less data to process, store, read and index, will be optimized.

Reduction of the database size will decrease the required storage disk space as well as the disc space required for backup. As a result the overall disk space required for storage will be reduced.

In addition backup cycles will be shorter, leading to less downtime and faster data recovery when recovery as such is required.

The end result of those features mentioned above is overall cost reduction resulting from reduction of a hard drive cost, database licensees cost, processing time and computer hardware cost, maintenance cost and electricity cost. In addition, an overall system performance improvement is achieved.

The foregoing and other objectives, features, and advantages of the invention will be apparent from the following and more particular, descriptions of the preferred embodiments of the invention, as illustrated in the accompanying drawings.

BRIEF DESCRIPTION OF THE DRAWINGS

Common reference numerals are used throughout the drawings and detailed description to indicate like elements.

DETAILED DESCRIPTION

Figure 1:
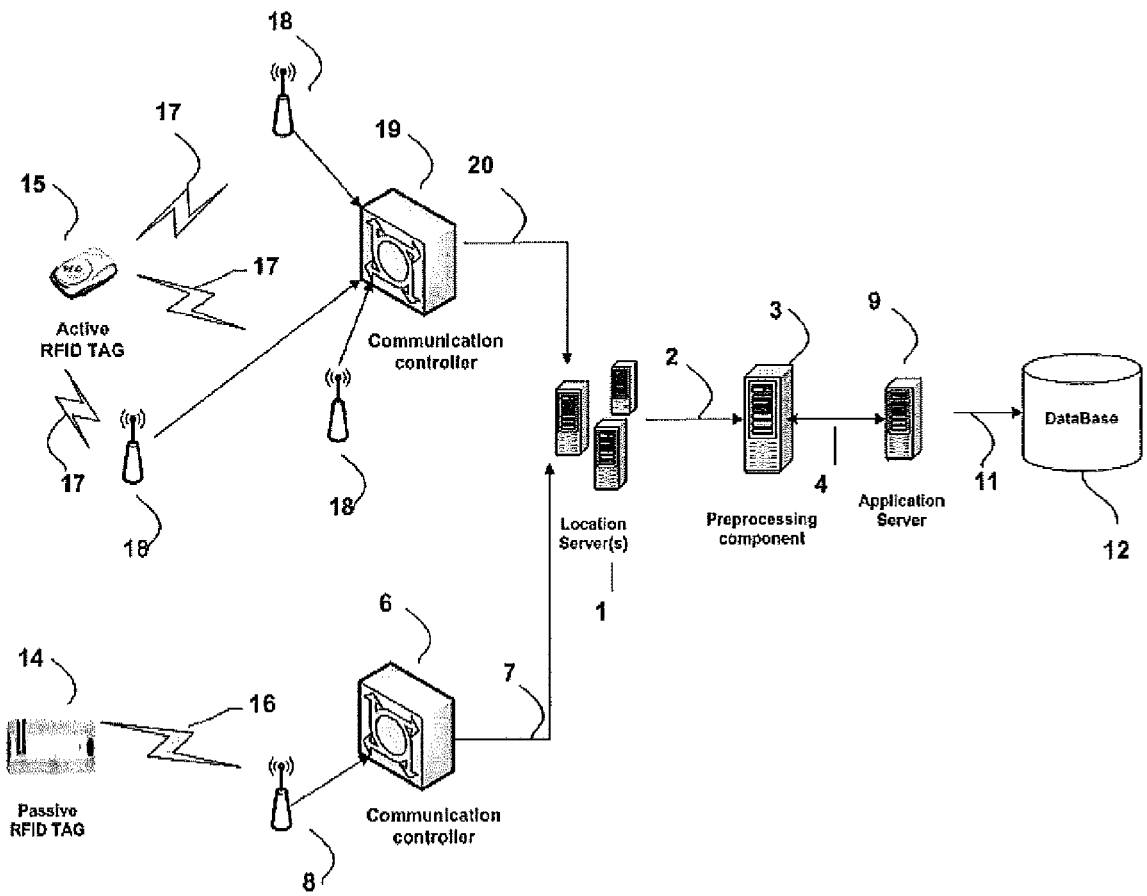
FIG. 1 depicts a typical, physical deployment layout with numerous location servers reporting location of RFID tags, connected to a preprocessing component (e.g. application gateway) according to a preferred embodiment of this invention. The preprocessing component (e.g. application gateway) gathers the data from all the location sources and transforms it into the location application internal format which stores the data into a Database.

The present invention relates to location system, and more specifically, to reduction of location data and/or storage of such data in a database by location applications.

One of the main uses of databases in RTLS systems is to keep the records of the located units (e.g. tags) along time. The records may include a large variety of parameters including: Location data, tag telemetry, tag status, etc.

In a large RTLS system including thousands or tens of thousands of located units, the amount of data stored in a relatively short period of time may be very large and exceed tens of Gigabytes. Large databases become slow and require high computation resources to handle them in addition to storage space.

Moreover, very large databases require a long backup time and any typical query needs to search among hundreds of millions of records.

However, due to the nature of RTLS systems and the located units, much of the information stored in the database is redundant and can be filtered using smart filters.

Therefore, it is the purpose of this patent to provide a very powerful and efficient method to reduce the size of the database thus significantly improving the performance of the RTLS system and without losing any valuable information of the located units.

A typical RTLS application system implementation includes several key elements; among these elements are several communication channels between the RTLS location system and the RTSL application, the preprocessing component (e.g. application gateway, standalone application, etc.) between the location system and the location application and a database, where data is stored.

The preprocessing component (e.g. application gateway, standalone application, etc.) unit includes one or more SW functions which filter, dilute or combine the data based on various parameters as specified by the user or as automatically selected by the system based on different operating conditions.

In accordance with one embodiment, the filter is a distance filter and motion filter. This filter dilutes the data based on the physical distance between the reported located unit in two location reports and whether the mobile unit is static or in motion when it is located. The motion status of the mobile unit (e.g. in motion, static, a speed higher than a threshold, an acceleration higher than a threshold, etc.) can be used to change the dilution criteria (e.g. rate of dilution, distance threshold, etc.).

In another embodiment, the filter dilutes reports based on the time stamp in the location report of the located unit, said dilution based on the time difference between reports, the time of the day and/or timeframes of user's interest.

Another embodiment consists of an aggregation trail filter. This filter compares the located unit location to one or more known trails which each has a trail ID. Each of the trails can be either preset in the system or created by it during run time, using self-learning algorithms. The database size reduction is achieved by storing in the database just the trail ID of the trail in which the mobile unit was located, instead of the mobile unit location.

In another embodiment, the filter is a fix count filter which filter dilutes the located unit location report based on a fix count of the number of location reports received by the system.

Additional filters which can be used in other embodiments or in conjunction with the previous ones include a zone filter which provides a reference of the located unit location to a specific point within a specified zone which may be either predefined or a self learned adaptive zone on an actual map within the RTLS application. Another filter includes telemetry data based filter which dilutes location reports based on the telemetry data that the unit reports.

As can be easily understood from the above description, filters can be combined in many different ways to achieve higher degree of dilution and optimize the database size and performance.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Some embodiments of the invention are herein described, by way of example only, with reference to the associated drawings. With specific reference now to the drawings in detail, it is stressed that the details shown are by way of example and for purposes of illustrative discussion of embodiments of the invention. In this regard, the description taken with the drawings makes apparent to those skilled in the art how embodiments of the invention may be practiced.

The term "mobile unit" or "mobile device" means any portable wireless device being located by a location system, including unidirectional or bidirectional communication means, stand alone or integrated into other devices, battery powered or externally powered by any other source, passive, semi-passive or active RFID tags and also portable wireless devices including other communication means in addition to the one used to communicate with the location transceivers (e.g. ultrasound, infrared, low frequency magnetic interface, wired serial interface, etc.).

The term "preprocessing component" refers to a hardware or software component which communicates between a location system and a location application. The preprocessing component gathers the data from the location system and may perform different functions like data normalization and/or transformation into an internal format. The preprocessing component also filters and/or dilutes the location reports or combines their information, which is described in this proposed patent application. A preprocessing component may be implemented as an application gateway, be part of an application or be a standalone application. It may be a web-based application connected to the location server and/or to the location application through the internet. In a different system architecture, the preprocessing component may be implemented as a trigger or store procedure in a database. This architecture is typically less common.

The term "tag sensors" data means any information that a mobile unit (e.g. RFID tag) transmits from a sensor it is connected to and that the mobile unit transmits in addition to its identifier and other parameters (e.g. tag type, category, RF channel number, transmit power, etc.). Examples of tag sensor data can be temperature, pressure, humidity, light intensity, liquid level, audio signal intensity, compass information, weight, battery status indication and motion indication (e.g. speed, acceleration, rotational speed, etc.).

The term "located" when referring to located unit or units, means any information reported on a monitored, tracked, traced and located mobile unit by the system. This information can include mobile unit location as well as any telemetry like temperature, pressure, humidity, battery status indicator and motion indication.

Referring now to the figures and in particular to FIG. 1, the main components of a basic location system according to an embodiment of this invention are described. FIG. 1 describes a system comprising of a single or several location servers 1 which are connected to a preprocessing component 3 through an Ethernet 2 network. The preprocessing component 3 is connected and communicates with the location application server 9 through an Ethernet 4 network. The data transferred on the interface between the preprocessing component 3 and the location application server 9 is further described in FIG. 2.

Also referring to FIG. 1 and to an embodiment of the present invention, location of an active RFID tag 15 and a passive RFID tag 14 are shown.

The active RFID tag 15 transmits multiple wireless signals 17 which are received by suitable receivers 18 which are in a communication range with that RFID tag 15. Those wireless signals are preferably radio signals (e.g. signals in accordance to IEEE802.11x, IEEE802.15.x, cellular phone signals, Ultra wideband signals, etc.) but in other preferred embodiments they may also be ultrasound signals, infrared, near field low frequency (LF) signals (e.g. at 125 KHz) and any other type of wireless signal in accordance to a proprietary protocol or a combination of different signals.

When the receivers 18 in communication range (the communication range will vary according to the wireless technology used, antenna type, transmission power, etc.) receive the wireless signals 17 transmitted by the tag 15, they decode the transmitted data message and also perform some measurements on the received signal 17. Those measurements can consist of a very simple measurement as presence detection, or RSSI measurement, TOA measurement, AOA measurement, distance measurement or any other measurement which can be used to estimate the location and/or status of the tag 15.

Still according to this embodiment, the receivers 18 transfer the received data message and the measured parameters to a communication controller 19 which decodes the data message. The data message typically includes the tag identification and telemetry data information such the tag status (e.g. battery status, motion status, etc.) and other telemetry fields (e.g. pushbutton information, temperature sensing, GPS data, etc.).

Other embodiments may include receivers 18 which also perform the message decoding and are directly connected to the location servers 1 (no communication controller).

The message data along with the measured parameters 20 from all the receivers 18 which received the tag signal 17 are transferred by the communication controller 19 to a location server 1. To the skilled in the art it may be obvious that the receivers 18 may be grouped in one or more communication controllers 19 which are also connected to the location servers 1.

Therefore, once the location server 1 receives the message data and the corresponding measured parameters 20 it starts a location process which results in an estimate of the tag 15 position.

This location estimate of the tag together with other tag information is included in a location report 2 which is transferred by the location server 1 to a location application.

Typically and according to an embodiment of the present invention, the location report will include the tag 15 position, the tag 15 identification (e.g. MAC address), the time stamp of the location (the time at which the tag reports 20 were received by the location server) and tag telemetry.

According to an embodiment, the location server 1 may use the measured RSSI to estimate the tag 15 position. Other embodiments may include other location methods based on Time Difference of Arrival (TDOA), distance measurement, Angle of Arrival (AOA) or a combination of several techniques. In this case, the location report 2 may also include other parameters like location technology used to locate the tag 15, tag type, etc.

Now referring to the passive RFID tag 14, the passive RFID tag 14 is interrogated 16 by the reader 8 which in response transmits a wireless signal 16 back to the reader 8. The tag 14 information (e.g. ID, telemetry fields) is decoded by the reader 8 which is also part of a location system and transferred to a communication controller 6 which typically concentrates several readers 8.

The tag 14 information 7 is finally sent to the location server 1 which also knows the reader 8 physical location. The location of the reader 8 can be specified by the user (e.g. in case it's a fixed unit) or estimated by the location system itself (e.g. when the reader 8 is a mobile RFID reader). Since typically the communication range between the passive RFID tag 14 and the reader is short (up to few meters), the reader 8 location can be used to estimate the tag 14 location.

Still referring to FIG. 1, the location application server 9 is connected to a database 12 through an Ethernet 11 network.

The location data and the estimated position of the tags 14-15 flows from a single or multiple location servers 1 to the preprocessing component 3, from the preprocessing component 3 to the location application 9 which stores the data in the database 12 of any form or type.

As can be easily understood, the communication bandwidth, communication type, protocol or category can vary between actual implementations in other preferred embodiments.

Figure 2:
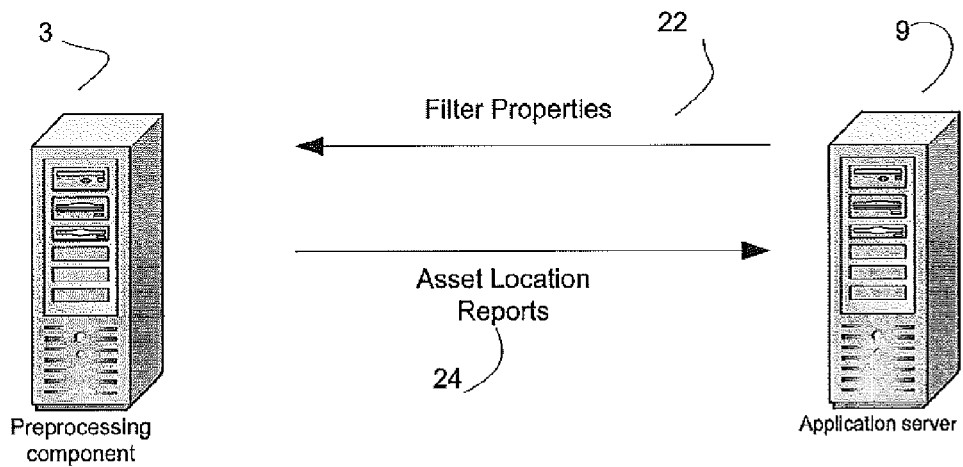
FIG. 2 depicts a physical deployment layout of the preprocessing component (e.g. application gateway) and the application server according to a preferred embodiment of this invention. It also describes the context of the protocol exchange between the two.

Referring now to FIG. 2, the physical layout of the preprocessing component 3, the location application 9 and the communication between these two components is described. The preprocessing component 3 and the location application 9 are connected through an Ethernet 22, 24, network. This communication is bidirectional and includes location information sent from the preprocessing component 3 to the location application server 9 on a dedicated communication channel 24 such as a queue, or other communication method, and filter properties and other communication parameters sent from the location application server 9 to the preprocessing component 3 on communication channel 22 from the location application server 9 to the preprocessing component 3. The filter properties provide the preprocessing component the required information to filter out location reports received from the location servers 1.

Figure 3:
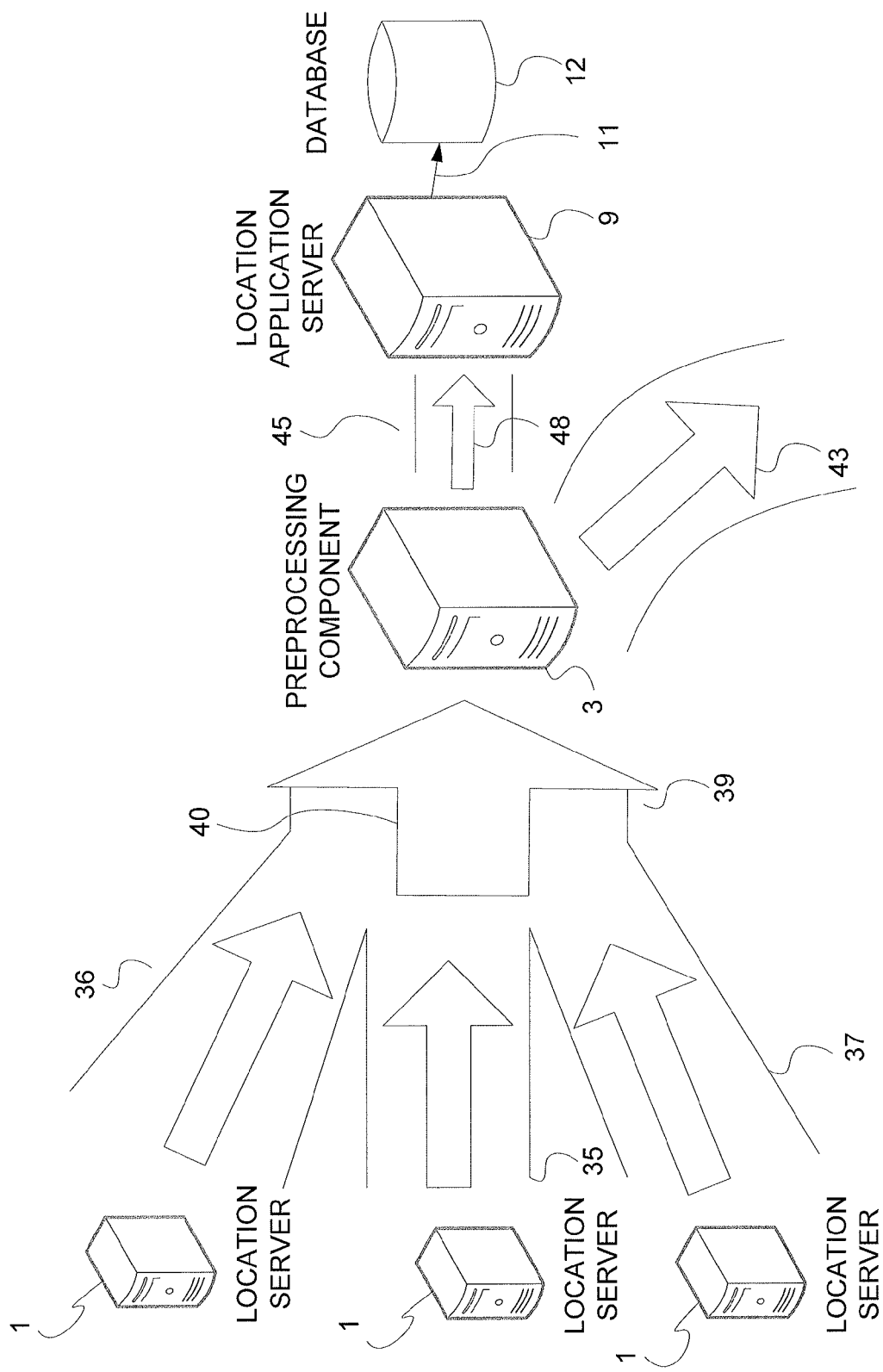
FIG. 3 is a pictorial diagram describing the high level data flow of a preferred embodiment of this invention and graphically illustrates the location reports volume reduction and its effect on the volume of location reports that end up getting to the location application.

Referring now to FIG. 3, the high level data flow of an embodiment is described. In this figure several location servers 1 report location information of located units, each may be using a different location method and each server reports on a dedicated communication channel 35-37 to the location application. All the location information, of all the mobile units, is aggregated into a single communication channel 39. In other embodiments, the specific implementation of this communication channel may be different and include a queue, database table or any other proprietary communication method. The dotted arrow 40 represents the count of location reports of all located units during a single period of time. The preprocessing component 3 filters the data according to the specified criteria and processes described in FIGS. 4-11. In this figure the preprocessing component dilutes the total volume of location reports 40. Some of these location reports will be diluted and ignored, arrow 43 represents the volume of the location reports diluted. The remaining location reports will be passed through communication channel 45, arrow 48, represent the total volume of these location reports. The location application server 9 will store this information in the database 12 through communication channel 11. Therefore and according to this preferred embodiment, the total location data stored in the database 12 volume is less (as represented by arrow 48) than the total volume of location reports reported 40 by the location servers connected to it.

Figure 4:
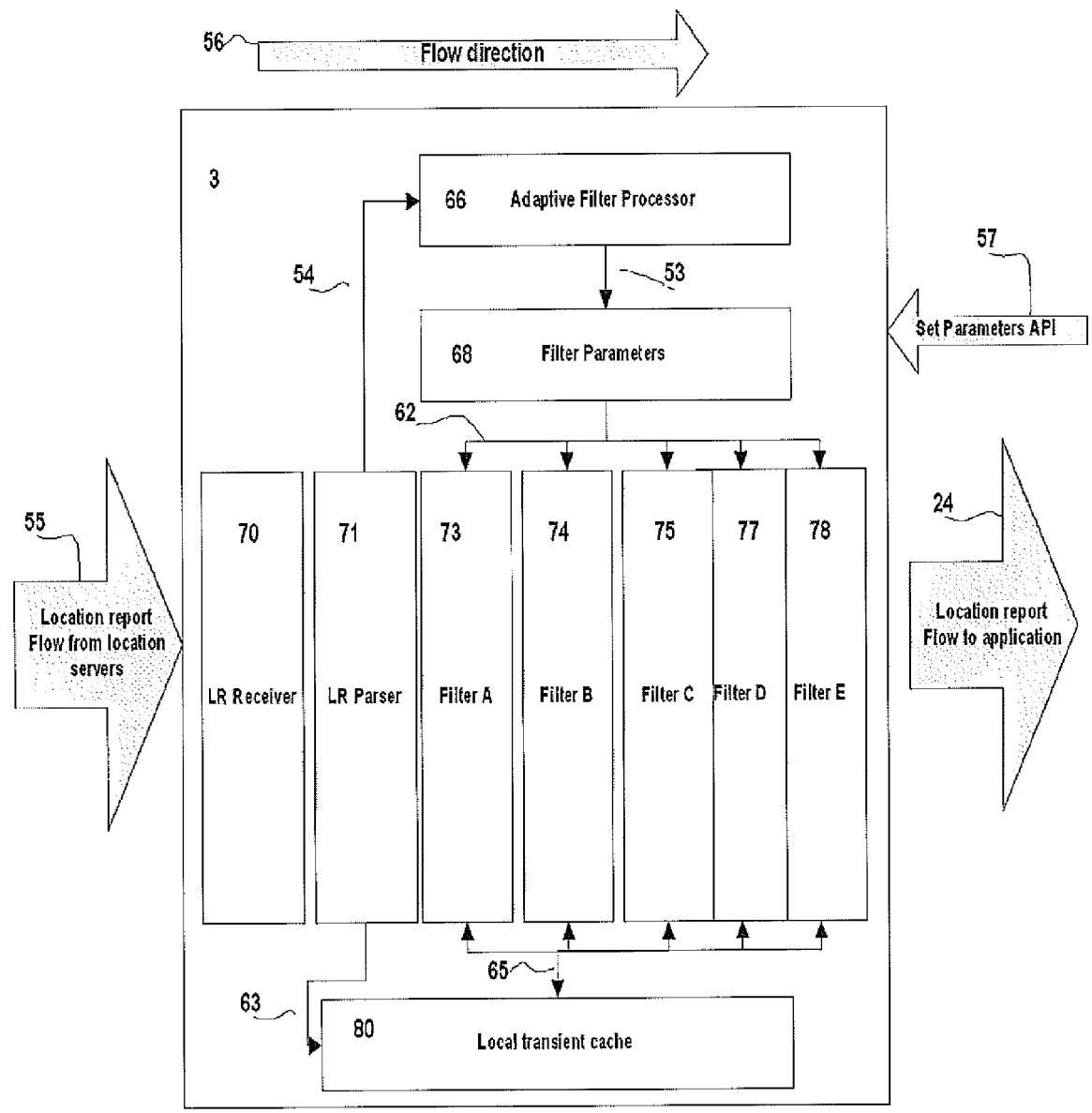
FIG. 4 is a block diagram depicting the logical components of a typical location application preprocessing component (e.g. application gateway) and the relation and data flow between each component according to a preferred embodiment of this invention.

Referring now to FIG. 4, the block diagram of the logical components of a typical location application is described. Those components include a preprocessing component 3 the interface and data flow from the location servers 55 and the interface and data flow to the location application server 24.

The data 55 flow direction is from left to right 56 and is processed by the following data processing modules, while in different preferred embodiments these modules may be deployed on a single or on a multiple number of servers, and multiplied according to the specific preprocessing component implementation:

The location report receiver 70, communicates with the location servers and receives the data, the data is transferred to the location reports parser 71.

The location reports parser 71 parses the data and transforms it into a uniformed format. The location report parser 71 also stores the location information of all mobile units in the preprocessing component transient cache 80. The location reports parser 71 and the transient cache 80 communicates thru a single communication channel 63 where information is only stored to optimize the parser performance. Location reports are also reported to the adaptive filter component 66 through channel 54. The adaptive filter component 66 processes the data and sets filter properties for the adaptive location report filters. Next, the location reports are passed on to the preprocessing component filters 71-78 which filter and dilute the data.

Filters 73-78 filter the data according to the properties set by the filter parameters component 68. The filter parameters component 68 properties can be set either by the preprocessing component API 57 or by the adaptive filter component 66 which communicates 53 with it. All filters 73-78 communicate with the filter parameters component 68 via a central communication channel 62. Some filters may require historical location report data in order to process the data and dilute it. The transient data cache 80 which includes this data is accessible to all filters 73-78 via communication channel 65. Each filter component can also store data in the transient data cache 80 if the actual filter implementation requires so.

Note that location reports are processed through the filter components in either a sequential order, in parallel or any other way. If filters are processed in parallel, statistical methods may be used in order to determine if a location report shall be diluted or combined.

The filtered location reports are communicated on a dedicated communication channel 24 such as a queue, or other communication method to the location application.

Figure 5:
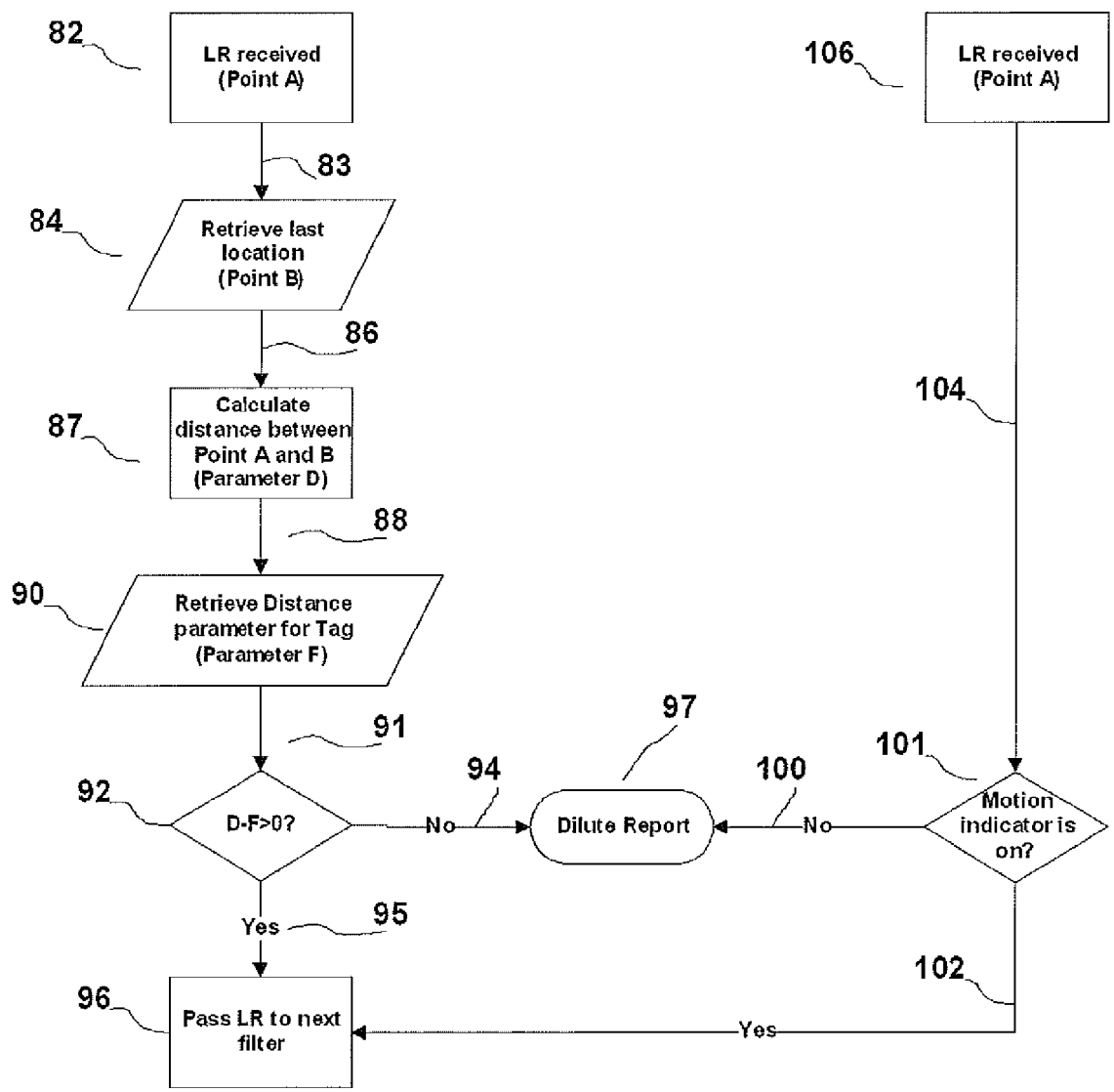
FIG. 5 is a flow diagram depicting a distance filter process and a motion filter process according to a preferred embodiment of this invention.

Referring now to FIG. 5, a flow diagram depicting a distance filter process and a motion filter process according to another embodiment of the invention is shown.

The distance filter process begins when a location report (LR) of a located unit is received 82. We will designate the specific mobile unit location as point A. Next 83, the previous location report of the same located unit is retrieved from the transient cache 84 or directly from the database. We will refer to this previous location as Point B. Next 86, the distance between Point A and Point B is calculated 87. We will refer to the distance calculated between the points as Parameter D. Next 88, a filter setting that represents the maximum distance between two locations which allows diluting one of the locations, Parameter F, is retrieved 90 from the local transient database. Next 91, Parameter D and Parameter F are compared 92. If Parameter D is greater than Parameter F 95, the location report will be passed on to the next filter for processing 96, as depicted in FIG. 3. If Parameter D is smaller or equal to Parameter F 94, the location report is diluted 97. In that case the location report processing will stop.

The motion filter process begins when a location report of a mobile unit is received 106. A motion indicator designates that the unit is in motion. Next 104 the filter determines if the motion indicator, in the location report structure, is set 101. If the unit is in motion 102, the location report is passed on to the next filer in the location report flow, as designated in FIG. 3.

If the mobile unit is not in motion 100, the location report will be diluted 97. And the location report processing will stop.

The motion status of the mobile unit (e.g. in motion, static, a speed higher than a threshold, an acceleration higher than a threshold, etc.) can be used to change the dilution criteria (e.g. rate of dilution, distance threshold, etc.).

In other embodiments, the two filters described above may be implemented as a single process or as two separate processes processing the location reports one after the other.

Figure 6:
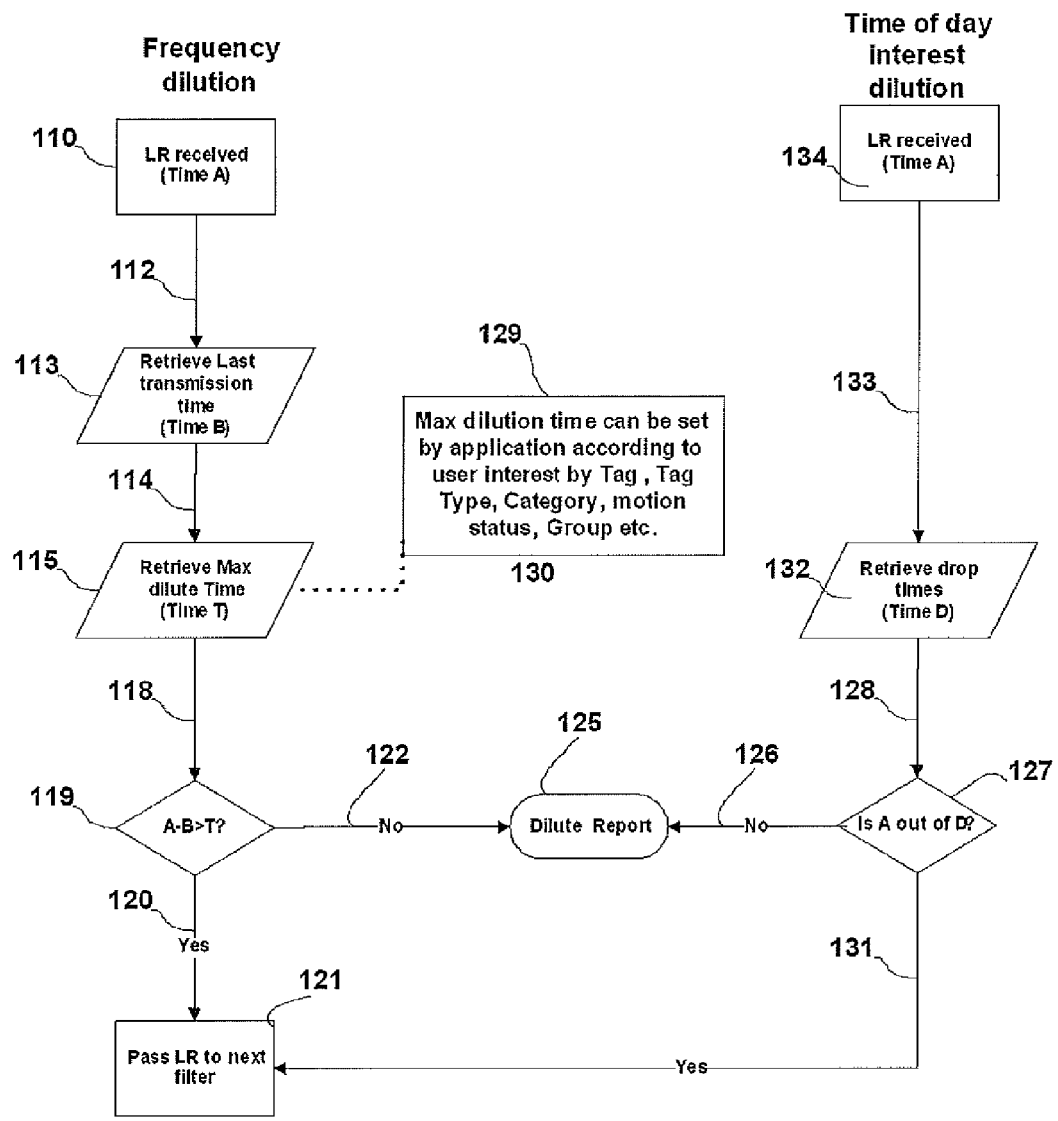
FIG. 6 is a flow diagram depicting an "ignore by time" filter which filters by time differences between reports and by actual time slots of interest according to a preferred embodiment of this invention.

Referring now to FIG. 6, it shows a flow diagram describing a filter that dilutes location reports by the actual time of report, a filter that dilutes location reports by the time between reports and a filter that dilutes location reports by configurable time slots of interest. This figure describes another embodiment of this invention.

The location report frequency filter process begins when a location report is received 110 at a specific time of the day. We will designate this time as Time A. Next 112, the last transmission time of the located unit will be retrieved 113. We will designate this time as Time B. Next, 114, the maximum time difference between reports will be retrieved 115, we will refer to this value as Time T. In another embodiment, this filter will retrieve Time T 130, as a parameter of the tag type, location technology, tag category, tag group or any other parameter which is related to the unit or in the location report. Another variation of this preferred embodiment will also allow the user to set these parameters dynamically 129, thru the preprocessing component API on run time.

Next 118, the difference in time: Time A−Time B is calculated 119. If the difference is larger than Time T 120, the location report is transferred to the next filter for processing 121. If the difference in time 119, is smaller than Time T 122, the location report will be diluted 125.

The time of the day interest filter process begins when a location report is received 134, at Time A of the day. Next, 133, the time of the day when location reports can be diluted is retrieved 132. We will refer to that time as Time D. In one embodiment of the invention, this time is preset by the user, while in another preferred embodiment, the system will use a self learning component and gather information regarding the typical times of the day on which the system users are more interested in up-to-date location information and determine the values of Time D accordingly. Next 128, it will be determined if Time A is out of Time D range. If it is within Time T range, 126, the location will be diluted 125. If it is out of Time T range 131 the location report will be transferred to the next filter 121.

As can be easily understood to those skilled in the art, the rules for dilution of location reports may vary among different preferred embodiments. Referring to the time of day filter for example, the dilution will be based on comparing the time stamp in the location report to specific times which may include several time windows during the day as well as different time windows during different days of the week, month, year or any other preferred time unit.

Figure 7:
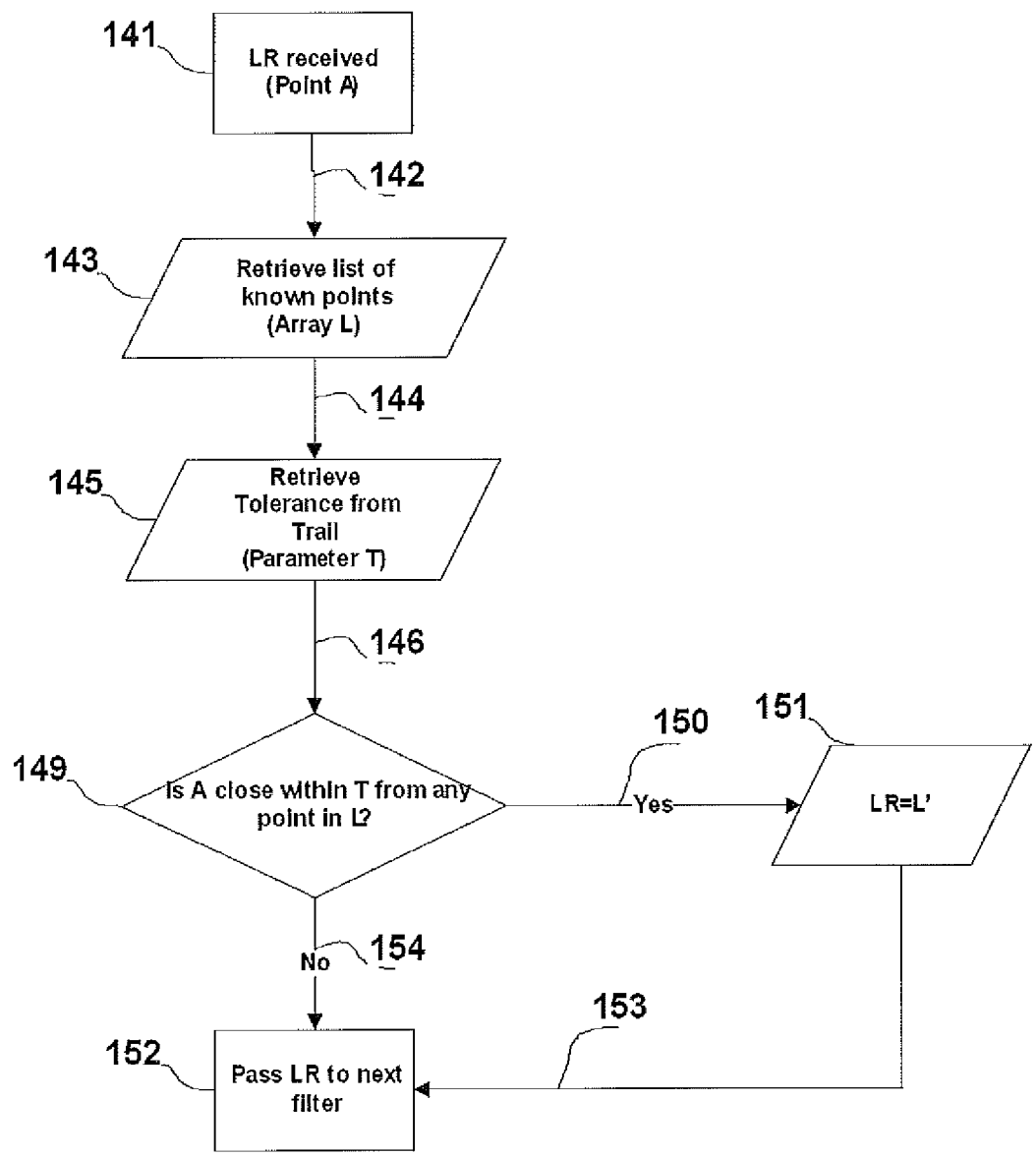
FIG. 7 is a flow diagram depicting an aggregation to trail filter, which references a known, fixed location on a trail known by the location application, according to a preferred embodiment of this invention.

Referring now to FIG. 7, this is a flow diagram depicting an aggregation to known trail filter and is another embodiment of the invention.

The process begins when a location report is received 141, including a located unit at Point A. Next, 142, the system will retrieve a list of points (e.g. represented as coordinates in a map), composing a typical known trail and stored as an array of points, Array L. The trail retrieved can be a parameter of the mobile unit type, the map the mobile unit is located on, the mobile unit category, the mobile unit group, the time of the day etc.

Next 144, the system will retrieve a tolerance Parameter T, 145, which will be used in the next step 146 and its following step 149, of the flow.

In step 149, the filter will check if Point A is within Parameter T proximity to any point of Array L. If it is within that proximity 150, the actual location of the mobile unit will point 151, to a known location L' on the typical path Array L. Next 153, the location report will be passed on 151, to the next filter for processing.

If the distance calculated in step 149 is not within Parameter T proximity to any point of Array L 154, the location report of the mobile unit will remain as it was originally reported in step 141, and passed on to the next filter 152.

A typical, practical usage of a filter as such could refer to a typical path of tagged equipment from a certain department to the maintenance department, tracking tagged equipment supply trail in a manufacturing plant or tracking a routine patrol pattern. Filtering those routine paths will provide some of the advantages of the present invention. In addition statistic analysis of located units that are located in known paths can assist with time and motion studies of any institute or plant.

In addition, and in another embodiment, a specific filter implementation may include retrieving a plurality of typical trails and paths for each location report and each located unit and validate each of these trails sequentially, then selecting the best matching trail.

Typical trails may be of different shapes, size and/or consist of any number of points. Trails may intersect and have start and end points in different maps.

Figure 8:
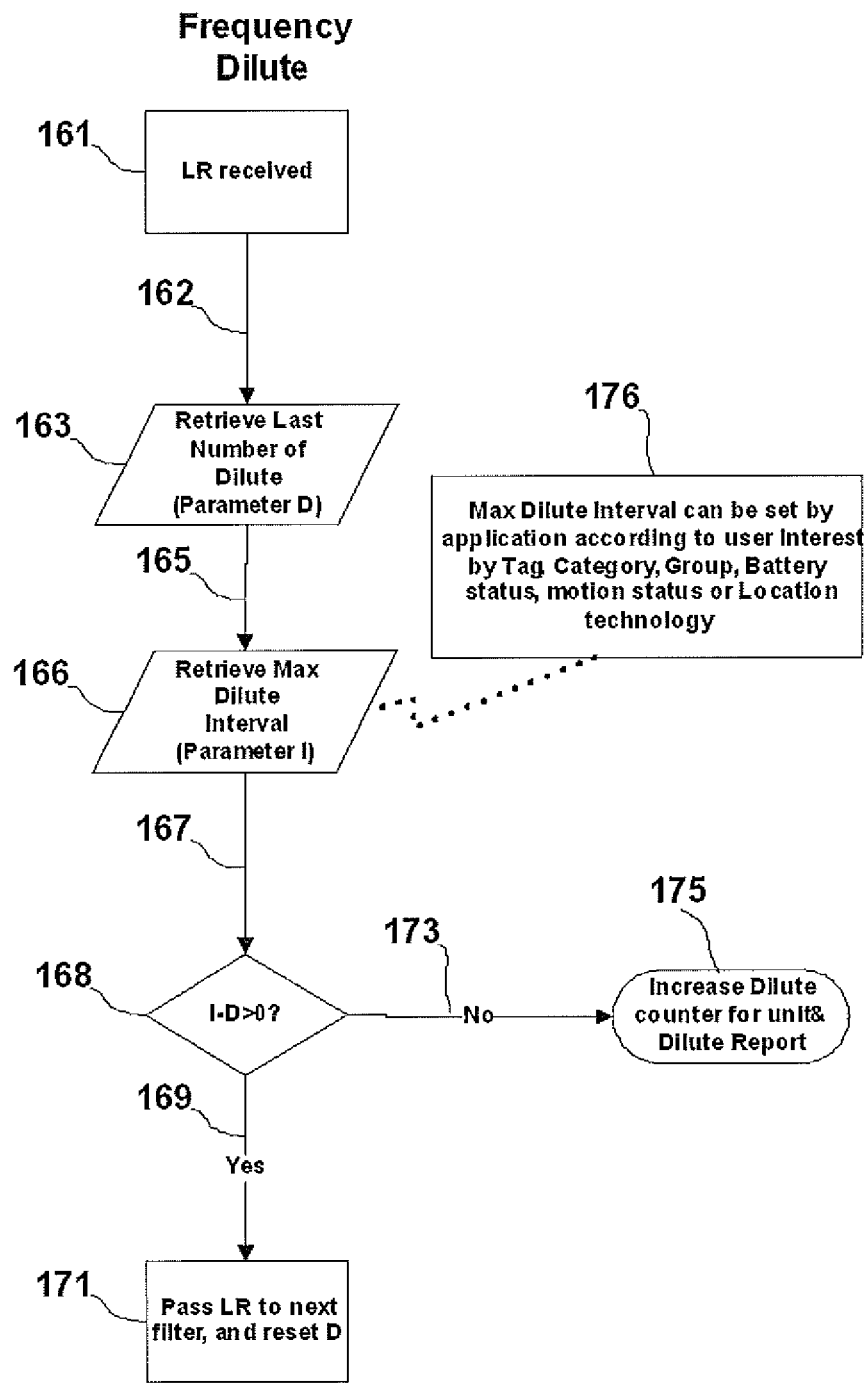
FIG. 8 is a flow diagram depicting fixed-count based filter process that dilutes or combines a location report by a fix ratio between location reports that are diluted and ones that are stored (drop frequency).

Referring now to FIG. 8, a flow diagram depicting a fixed-count based filter process is shown. This filter dilutes or combines a location report by a fix ratio, given by the ratio between the location reports that shall be diluted and location reports that shall be stored (drop frequency). FIG. 8 describes one embodiment of this filter according to the present invention.

The filtering process begins when a location report is received 161. Next 162, the system will retrieve the number of sequential location reports that were diluted for that mobile unit 163. We will refer to that parameter as Parameter D. Next 165, the system will retrieve 166, the maximum number of location reports that can be dropped for that mobile unit, Parameter I. Parameter I can vary between mobile units and for instance 176, it can be a parameter of the mobile unit type, mobile unit category, mobile unit group, mobile unit battery level, mobile unit location, the location technology used to locate the tag, the mobile unit motion status (indicator) or any other user preference.

Next 167, Parameter I and parameter D will be subtracted from one another (i.e. Parameter I-Parameter D) 168. If the result is greater than Zero (0) 169, the location report will be passed on to the next filter 171, and the process will reset parameter D to 0.

If the result of subtracting Parameter I and parameter D, 168, is smaller or equal to zero (0) 173, then the location report is diluted, 175, and the dilution counter, Parameter D, will be increased by 1.

Figure 9:
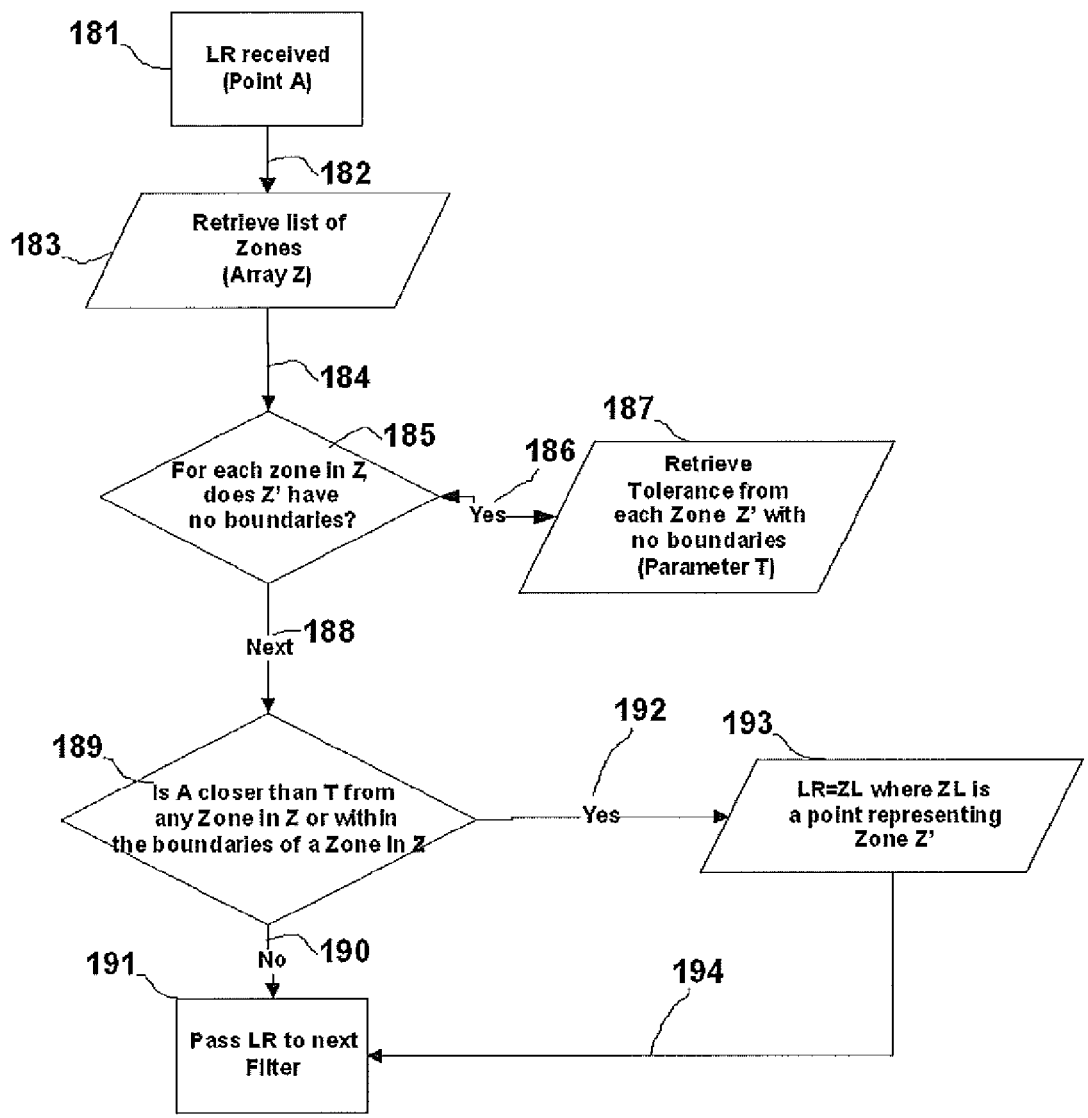
FIG. 9 is a flow diagram depicting a filter which dilutes location report by proximity to a known point within a zone or if the mobile unit is in or out that zone boundaries according to a preferred embodiment of this invention.

Referring now to FIG. 9, a flow diagram depicting the dilution of a location report by proximity to a point in a known zone or presence in a know zone. FIG. 9 also depicts referring the located mobile unit location to a known point within that zone. FIG. 9 describes a filter according to another embodiment of the present invention.

The process begins when a location report is received 181, and in which a mobile unit is located at Point A. Next 182, the system will retrieve a list of zones 183 including a fixed point within each zone, stored in Array Z.

Next 184, the system will determine for every Zone Z' in Zone array Z, whether the zone Z' has defined boundaries or not 185. It will retrieve 186 a tolerance Parameter T 187, for every zone that has no defined boundaries and it is represented by a point, parameter T will be used in the next steps 188-189 of this filter process. Both the retrieved zone list, Array Z, and the tolerance parameter, Parameter T, can be a parameter of the mobile unit type, the map the mobile unit is located on, the mobile unit category, the mobile unit group, a time of the day, etc.

After parameter T was retrieved for each zone with no defined boundaries 188, In step 189, the process will check if Point A is within Parameter T proximity to any of the representing points within the zones in Array Z or if it is within any of a zone boundaries Z' of zone array Z. If it is within that proximity or within a zone boundaries 192, the actual location of the mobile unit will reference 193, a known location ZL, which is a point within one of the zones, Z', in Array Z. Next 194, it will be passed on to, 191 the next filter for processing.

If the distance calculated in step 189 is not within Parameter T proximity to any of the zones in Array Z, 190, the location report of the mobile unit will remain as it was originally reported in step 181, and passed on to the next filter, 191.

The description above, describes another embodiment which comprises the definition of at least one first zone of interest in which the mobile unit, can be located. The location of this mobile unit is compared against the limits of the zone of interest and the location report is diluted in accordance whether the mobile unit is in or out of said zone of interest. For example, a user may be interested to store in the database only location reports when the mobile unit is out of a certain area. Also in this case, when the mobile unit is located within that zone of interest, the location of the mobile unit can be replaced by a known point Z' within that zone.

Another variation of this method also in accordance with an embodiment of the present invention comprises a system with at least two zones of interest in which said mobile unit can be located. In this case, the location report will be stored in the database depending on in which zone of interest the mobile unit is located. For example, the dilution criteria may be different for each zone of interest. An example of this embodiment is a location system with two zones of interest, one indoors and one outdoors. The user is interested to have the ability to query the location history, based on the location zone of the mobile unit: (e.g. a tag). If the tag is in an outdoors zone then report more frequently (more location reports in the database) and if the tag is in an indoors zone, then report less frequently.

A typical, practical usage of a filter as such would be in inventory applications that combine inventory counts of goods, animals or people and location within areas of the inventory, security applications that are designed to count the number of people in or out of a certain zone in any given time or location and study of movement between zones and locations of equipment within a firm or between firms.

Figure 10:
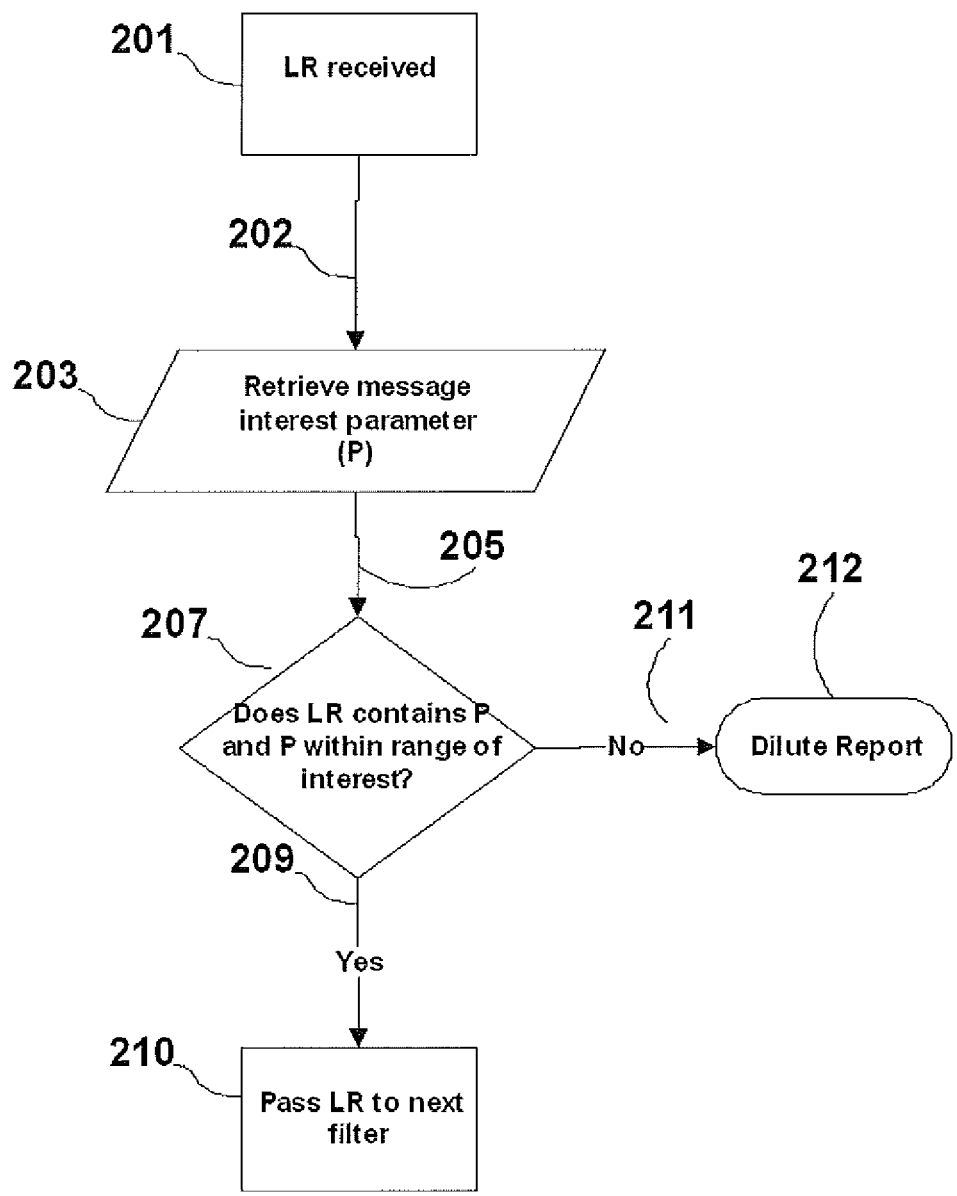
FIG. 10 is a flow diagram depicting a drop location report by location report telemetry data content, according to a preferred embodiment of this invention.

Referring now to FIG. 10, a flow diagram depicting a filter that drops location reports by location report telemetry data of tag sensors content is shown. This filter is according to one embodiment of this invention.

The process begins when a location report (LR) is received 201. Next 202 the message parameter of interest, parameter P is retrieved 203. Parameter P, and its range of interest, can be a function of either one or many parameters including the mobile unit type, the map the mobile unit is located on, the mobile unit category, the mobile unit group, the zone that the mobile unit is located in, the location technology that was used to located this mobile unit, the motion indicator status as indicated in the location report, etc.

Next 205, the system will determine if the location report contains Parameter P and if it is within the user's interest range 207. If it contains parameter P and it is within the range of interest 209, the location report will be passed on to the next filter 210. If Parameter P does not exist or it is out of the interest range, 211, the location report will be dropped, 212.

Other embodiments may include a filter that dilutes location reports if Parameter P is present in the location report.

For example, Parameter P may be an emergency pushbutton indication, transmitted as part of the tag telemetry data. In that case emergency calls (e.g. pushbutton pressed) are never filtered or diluted.

A typical use for that filter would be in temperature logging, humidity logging and pressure logging applications where reports within a normal range will be filtered.

Other preferred embodiments may include filters in which the filtering, dilution or combination criteria are based on many other parameters. Following some examples:

Location quality (e.g. location reports with poor location quality will be diluted more frequently).
Database load (e.g. more dilution when the load is high)
Database size (e.g. more dilution if the database is close to the space limits)
Mobile unit priority (e.g. units with higher priority will be less diluted)

Figure 11:
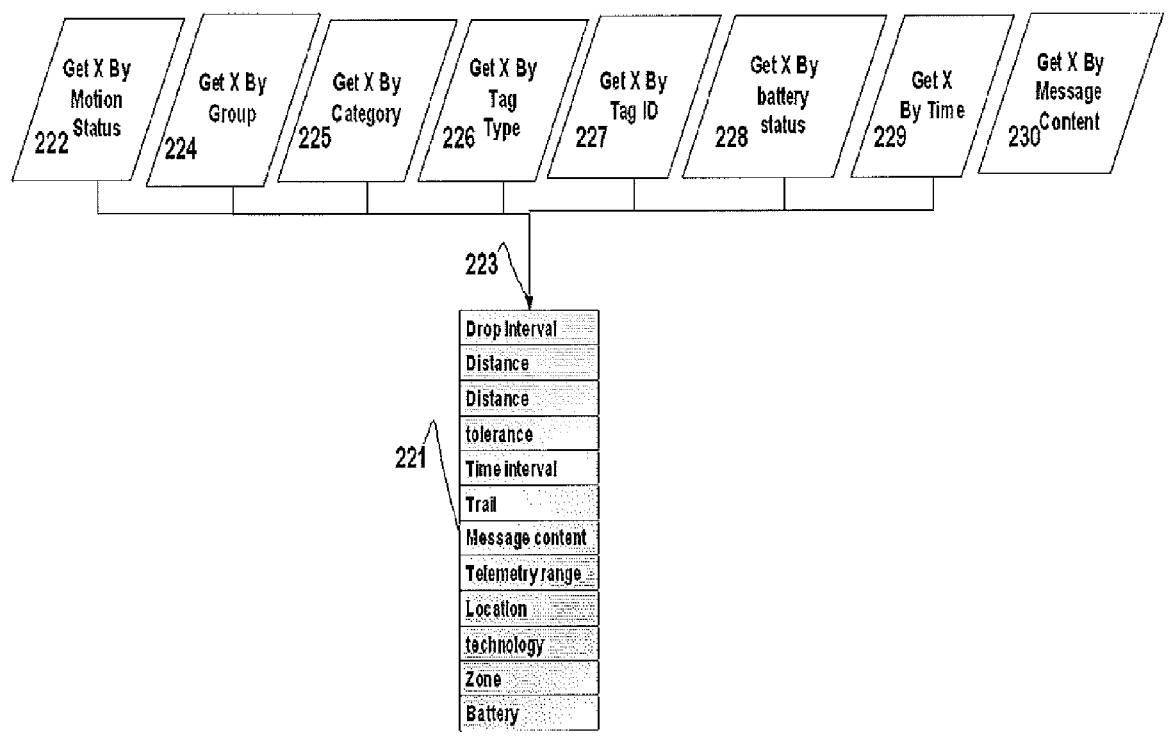
FIG. 11 is a block diagram depicting all the options to retrieve the allowed drops by various parameters as described in the sample drop filters described in the invention.

FIG. 11 shows a block diagram depicting all the options to retrieve the allowed location report drops by various parameters as described in the sample dilution filters described above in FIG. 5, FIG. 6, FIG. 7, FIG. 8, FIG. 9 and FIG. 10.

The block diagram illustrates that each parameter described in data structure 221, can be retrieved as a parameter with a number of values.

The mobile unit group, 224.
The mobile unit category, 225.
The mobile unit tag type, if it is attached to an RF ID tag, 226.
The mobile unit tag ID, if it is attached to an RF ID tag, 227.
The mobile unit battery status 228 (e.g. predefined battery status conditions like: high, medium and low).
The time of the day on which the mobile unit was located on 229.
The motion status (i.e. whether it is in motion or not) of the mobile unit located 222.
The parameter in message content of the mobile unit 230.

Some of the retrieved parameters, and not limited to the ones listed, can be listed in a data structure 221. These include:

The dilute fixed interval.
The fixed distance between two location reports.
The distance tolerance between tags, form points of a trail and from a zone.
The time interval of the user's interest.
The list of typical trails.
The message content that is of interest.
The telemetry range of interest.

As may be obvious to the skilled in the art, the filters described above as well as the filtering parameters can be combined to create very sophisticated filters which dilute location reports according to a combination of a plurality of parameters. Thus, for example, a filter can dilute location reports if they include a specific content and are received at a specific time of the day.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for reducing a load of a database in a location system, the apparatus comprising:
  a memory storing instructions; and
  a processor that, when executing the instructions, is configured to:
    process a location report received from a location server that is interfaced to a wireless network comprising of at least one network device in communication range of a mobile unit that transmits a plurality of wireless signals including an identification of the mobile unit to the wireless network, the wireless network operable to report data used to estimate the location of the mobile unit and the location server operable to process the data reported by the wireless network to generate the location report;
    determine whether the location report satisfies a filtering condition, the filtering condition being established based on parameters, one of the parameters including a mobile unit identifier ID; and
    instruct that the location report be output to a location application for storage in a database if the location report satisfies the filtering condition, the database operable to store data records relating to the mobile unit, the data records comprising information reflecting an estimated location and an identification of the mobile unit.

2. The apparatus of claim 1, wherein the wireless signals include telemetry data, the location report includes the telemetry data, and the stored data records include the telemetry data.

3. The apparatus of claim 1, wherein the location report further includes a time stamp of a time that the data was received at the location server and the stored data records include the time stamp.

4. The apparatus of claim 2, wherein at least one of the parameters includes fixed data and the processor is configured to determine whether the location report satisfies the filtering condition by comparing data of the location report with the fixed data.

5. The apparatus of claim 1, wherein the location report further includes an estimated location of the mobile unit and at least one of the parameters identifies a zone of interest of the wireless network, and wherein the processor is configured to determine that the location report satisfies the filtering condition if the location of the mobile unit is within the limits of the zone of interest.

6. The apparatus of claim 5, wherein the zone of interest is represented by a single point location and the location in the data records is replaced by the single point location.

7. The apparatus of claim 5, wherein the zone of interest is a first zone of interest and at least one of the parameters further identifies a second zone of interest of the wireless network, and wherein the processor is configured to determine that the location report satisfies the filtering condition if the location of the mobile unit is within the limits of at least one of the first zone of interest or the second zone of interest.

8. The apparatus of claim 3, wherein at least one of the parameters identifies a time of day and wherein the processor is configured to determine whether the location report satisfies the filtering condition by comparing the time stamp with the time of day.

9. The apparatus of claim 2, wherein at least one of the parameters identifies battery status conditions and the telemetry data further comprises a battery status of the mobile unit, and wherein the processor is configured to determine whether the location report satisfies the filtering condition by comparing between the battery status of the mobile unit and the battery status conditions.

10. The apparatus of claim 3, wherein the location report is a second location report and at least one of the parameters comprises data in a first location report, the first location report being stored in the database and having been received by the location server before the second location report is received, and wherein the processor is configured to determine whether the second location report satisfies the filtering condition by comparing the data in the second location report with data in the first location report.

11. The apparatus of claim 10, wherein the first location report and the second location report each store an estimated location of the mobile unit, and wherein the processor is further configured to:
compare between the location of the mobile unit in the first location report and the location of the mobile unit in the second location report; and
determine whether the second location report satisfies the filtering condition based on a distance between locations of the mobile unit in the first and second location reports.

12. The apparatus of claim 10, wherein the processor is configured to determine whether the second location report satisfies the filtering condition based on a time difference between the time stamps of the first location report and time stamps of the second location report.

13. The apparatus of claim 3, wherein a plurality of location reports are received from the location server, the plurality of location reports comprising a first plurality of location reports and a second location report, the first plurality of location reports being received before the second location report, and wherein the first plurality of reports is stored in the database and the processor is configured to determine whether the second location report satisfies the filtering condition by comparing data in the second location report with data in the first plurality of location reports.

14. The apparatus of claim 1, wherein the processor is configured to determine whether the location report satisfies the filtering condition by determining if a mobile unit location in the location report is within a trail that describes a movement pattern, the trail represented by a trail ID, and wherein the location information in the data records is replaced by the trail ID.

15. The apparatus of claim 14, wherein the processor is further configured to determine whether the location report satisfies the filter ins condition by using self-learning analytical algorithms, the algorithms being operable to identify movement patterns, the movement patterns describing a repetitive behavior of the mobile unit, wherein the movement patterns identified by the algorithms are represented by a corresponding trail ID.

16. The apparatus of claim 1, wherein the processor is further configured to:
count a plurality of received location reports for the mobile unit reported by the location server with a counter, wherein at least one of the parameters includes a value of the counter for each location report; and
determine whether the location report satisfies the filtering condition based on the value of the counter.

17. The apparatus of claim 1, wherein the processor is configured to:
determine whether the location report satisfies a plurality of filtering conditions; and
instruct that the location report be output to the location application for storage in the database if the location report satisfies the plurality of filtering conditions.

18. The apparatus of claim 1, wherein the mobile unit is an RFID tag.

19. The apparatus of claim 18, wherein the location system further comprises at least two different types of RFID tags and the type of the RFID tag is reported in the location report by the location server, wherein the filtering condition differs based on the tag type.

20. The apparatus of claim 18, wherein the location system further comprises an ability to locate said RFID tag using at least two different location technologies, wherein the location technology used to locate said RFID tag is reported in the location report by the location server, and wherein the filtering condition differs based on the location technology.

21. The apparatus of claim 1, wherein the wireless signals are at least one of IEEE 802.11a/b/g/n radio signals, cellular radio signals, IEEE 802.15.1 signals, IEEE 802.15.4 signals, ultra wideband signals, ultrasound signals, and infrared signals.

22. The apparatus of claim 1, wherein the processor is included in a preprocessing component that is part of an application gateway.

23. The apparatus of claim 1, wherein a plurality of location reports are received from the location server, and wherein determining whether a location report satisfies the filtering condition results in a reduction in a size of the data stored in the database.

24. The apparatus of claim 1, wherein the mobile unit is configured to receive wireless signals, measure parameters of the received wireless signals, estimate its location based on the measured parameters of the received wireless signals, and report the estimated location to the location server, and wherein the location server is configured to generate the location report based on the location estimated by the mobile unit.

25. The apparatus of claim 24, wherein the mobile unit is configured to estimate the mobile unit location using a GPS receiver.

26. The apparatus of claim 24, wherein the network device is configured to transmit wireless beacons and the mobile unit is further configured to receive the wireless beacons.

27. The apparatus of claim 1, wherein the network device is further configured to transmit wireless beacons, and wherein the mobile unit is further configured to receive wireless signals, measure parameters of the received wireless signals, and report the measured parameters to the location server, and wherein the location server is configured to generate a location report based on the measured parameters reported by the mobile unit.

28. A method of reducing a load of a database in a location system, comprising:

receiving a location report from a location server that is interfaced to a wireless network comprising of at least one network device in communication range of a mobile unit that transmits a plurality of wireless signals including an identification of the mobile unit to the wireless network, the wireless network operable to report data used to estimate the location of the mobile unit and the location server operable to process the data reported by the wireless network to generate the location report;

determining, by at least one processor, whether the location report satisfies a filtering condition, the filtering condition being established based on parameters, one of the parameters including a mobile unit identifier (ID); and outputting the location report to a location application for storage in a database if the location report satisfies the filtering condition, the database operable to store data records relating to the mobile unit, the data records comprising information reflecting an estimated location and an identification of the mobile unit.

29. A non-transitory computer-readable medium storing instructions that, when executed by a processor, cause the processor to perform a method, the method comprising:

processing a received location report from a location server that is interfaced to a wireless network comprising of at least one network device in communication range of a mobile unit that transmits a plurality of wireless signals including an identification of the mobile unit to the wireless network, the wireless network operable to report data used to estimate the location of the mobile unit and the location server operable to process the data reported by the wireless network to generate the location report;

determining whether the location report satisfies a filtering condition, the filtering condition being established based on parameters, one of the parameters including a mobile unit identifier (ID); and instructing that the location report be output to a location application for storage in a database if the location report satisfies the filtering condition, the database operable to store data records relating to the mobile unit, the data records comprising information reflecting an estimated location and an identification of the mobile unit.

\* \* \* \* \*

UNITED STATES PATENT AND TRADEMARK OFFICE
CERTIFICATE OF CORRECTION

PATENT NO. : 8,478,290 B2
APPLICATION NO. : 12/868466
DATED : July 2, 2013
INVENTOR(S) : Baruch Yoeli It is certified that error appears in the above-identified patent and that said Letters Patent is hereby corrected as shown below:

In the Claims

Claim 15, col. 18, line 10, "satisfies the filter ins condition" should read -- satisfies the filtering condition --.

Signed and Sealed this
Twenty-fourth Day of September, 2013

Teresa Stanek Rea
*Deputy Director of the United States Patent and Trademark Office*